Feb. 15, 1966

A. P. HULTGREN 3,235,067

WRAP-AROUND FOR TAPE REELS

Filed May 18, 1964

Inventor:
Arnold P. Hultgren
By Bair, Freeman & Molinare
Attys.

United States Patent Office 3,235,067
Patented Feb. 15, 1966

3,235,067
WRAP-AROUND FOR TAPE REELS
Arnold P. Hultgren, River Forest, Ill., assignors, by mesne assignments, to Ameriine Corporation, a corporation of Illinois
Filed May 18, 1964, Ser. No. 368,007
1 Claim. (Cl. 206—52)

This application is a continuation-in-part application of my earlier application Serial No. 327,333, filed December 2, 1963, entitled Wrap-Around and Pressure Lock for Tape Reel.

This invention relates to improved covers for tape reels and it particularly relates to a tape reel cover having means for providing proper initial alignment between the cover and the reel.

In my earlier application, identified above, I disclosed a cover for a tape reel wherein means are provided for covering the openings or apertures commonly included in the flanges of tape reels. One of the advantages of the construction described therein is that the means provided for covering the openings in the flanges also assist in providing proper initial alignment between the tape reel and the cover and prevent the reel from falling through the cover during initial positioning of the tape reel on the cover. However, since some tape reels are provided with solid flanges, that is, without openings in the flanges, it is unnecessary to provide means for covering the openings such as provided in the construction described in my earlier application. However, it is still desirable to provide means for enclosing the space between the outer peripheries of the flanges of the tape reel in order to prevent dust and dirt particles from contacting the tape, while at the same time providing means for aligning the tape reel with the tape reel cover, which means also functions to prevent the tape reel from passing through the cover. Both of these functions are important during the initial positioning of the cover on the reel.

It is therefore an important object of this invention to provide a tape reel cover wherein means are provided for providing alignment of the cover with the tape reel while said means also prevent the reel from falling through the cover, whereby the initial positioning of the cover on the reel is greatly facilitated.

It is also an object of this invention to provide a tape reel cover having inwardly directed ears or ribs which are integral with the cover and which are adapted to abut one of the flanges of the tape reel to provide alignment between the reel and the cover during the positioning of the cover on the reel.

It is a further object of this invention to provide an improved tape reel cover having integral means for aligning the cover with the reel, wherein the cover is characterized by its simplicity and economy of construction and manufacture.

Further purposes and objects of this invention will appear as the specification proceeds.

A particular embodiment of the present invention is illustrated in the accompanying drawings wherein.

Figures 1, 2:
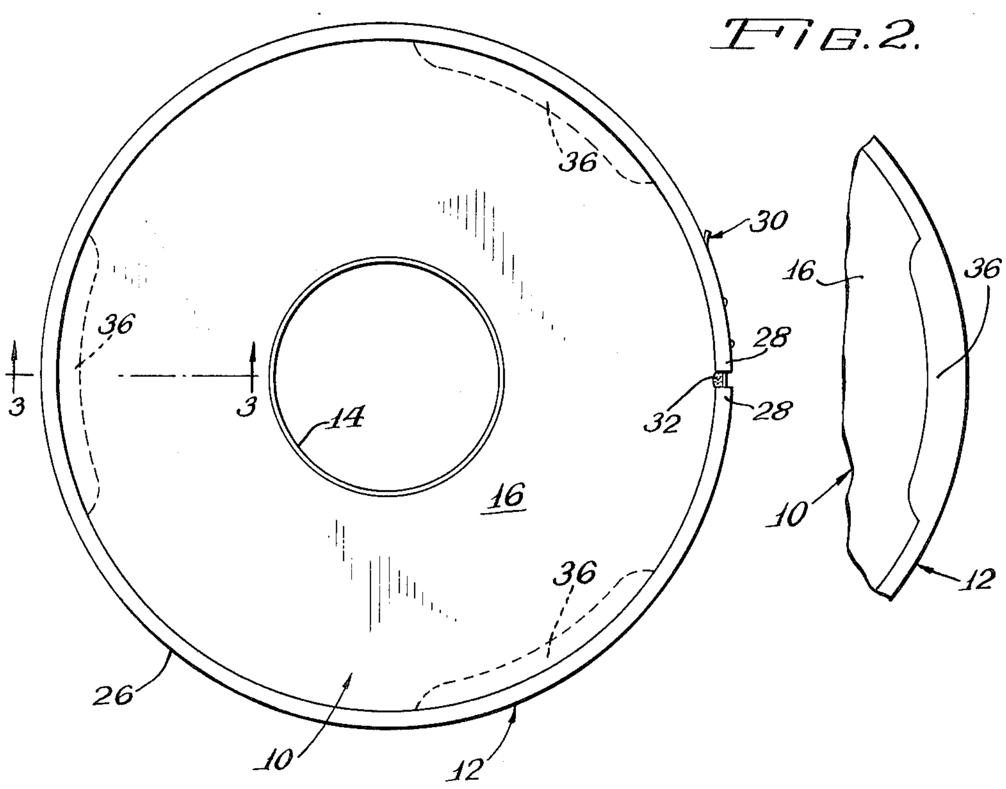
FIGURE 1 is a top plan view of my tape reel cover in place on a tape reel.
FIGURE 2 is a fragmentary view of the underside of the embodiment of FIGURE 1, particularly showing one of the integral means for aligning the cover with the reel.

Referring to the drawings, a tape reel 10 is shown having a cover member 12 positioned therearound. Film or tape T, such as computer or magnetic tape, is shown wound continuously around the hub 14 of the reel 10.

A pair of spaced, substantially parallel flanges 16 extend outwardly from the cylindrical hub 14; generally, the flanges 16 have circular outer peripheries 18 which are aligned with each other. The tape T is to be wound continuously around the hub 14 and between the side supporting flanges 16 of the reel 10. In the embodiment shown in FIGURE 1, the reel 10 is provided with solid flanges 16, that is, there are no openings therein. In order to substantially avoid the entry of dust or dirt particles into the storage area of the reel 10 and on the tape T stored therein, the cover member 12 is provided for covering the space between the flanges 16.

The cover or enclosure member 12 is generally cylindrical in shape when it is locked in place on the reel 10 and it substantially conforms to the outer peripheries 18 of the flanges 16 of the reel 10. The cover 12 also includes a pair of substantially parallel, longitudinal grooves or slots 24 on the inner periphery of the solid, central wrap-around portion 26 of the cover 12. The spaced grooves or slots 24 have lateral edges 25 and are adapted to sealably receive the outer peripheries of the flanges 16 in order to substantially prevent the passage of dust or dirt particles between the edges of the solid flanges 16 and the cover member 12.

In order to maintain the opposite ends 28 of the wrap-around portion 26 in a substantially dust sealing relationship, locking means 30 which may be similar to that described in my earlier application Serial No. 327,333, is provided. In order to assure sealing engagement between the opposite ends 28 of the wrap-around portion 26, a resilient gasket member 32 is provided and is adhesively secured to one of the ends 28, whereby upon drawing the opposite end 28 thereagainst, the locking means 30 causes the gasket 32 to be squeezed for sealing the ends of the wrap-around portion 26.

Figure 3:
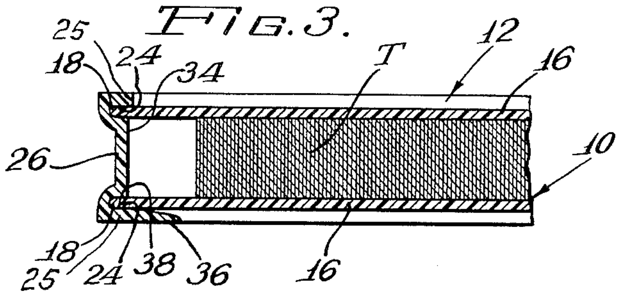
FIGURE 3 is an enlarged sectional view taken along the line 3—3 of FIGURE 1.

Since the inner periphery or surface 34 of the solid wrap-around portion 26 of the cover 12 is in substantial alignment with the outer peripheries 18 of the flanges 16 prior to locking of the cover 12 on the reel 10, the initial positioning or aligning of the flanges 16 within the grooves 24 of the cover 12 is awkward and difficult to accomplish. The reel 12 tends to fall through the cover 12 while attempts are made at positioning the cover on the reel since the entire outer peripheries 18 of both flanges 16 must enter the grooves 24 before the cover may be locked thereon. In order to overcome such problems, I provide projecting means extending inwardly from one lateral edge 25, which may take the form of a plurality of inwardly directed circumferentially spaced elongated ears or projections 36 exterior of both grooves 24. The upper surfaces 38 of the projections 36 are in substantial alignment with the lateral edge 25 of one of the grooves 24 whereby as a reel 10 is dropped into place in the cover 12, the projections 36 abut the outer portions of one of the flanges 16 to thereby align the outer peripheries 18 of the flanges 16 with the grooves 24. Thus, the projections 36 greatly facilitate the initial positioning of the cover 12 on the reel 10 and also substantially prevent the reel 10 from passing through the cover 12. The projections 36 extend inwardly only a short distance from the wrap-around portion 26, sufficient only to abut portions of the outer edge of a flange 16. Referring to FIGURE 3, the flange supporting projections 36 are preferably wedge shaped so that as the outer edge of a flange 16 abuts the wedged projection, it will ride upwardly thereon and will readily pass into a groove 24 as the cover 12 is being closed on the reel 10.

In the construction of my cover 12 it is highly desirable that it be made of a moldable plastic material. Also, the projections 36 may be located in the area of the sprue openings of the mold in which the cover 12 is formed.

The moldability of the cover 12 provides a simple and highly economical construction.

While in the foregoing, there has been provided a detailed description, of a particular embodiment of the present invention, it is to be understood that all equivalents obvious to those having skill in the art are to be included within the scope of the invention as claimed.

What I claim and desire to secure by Letters Patent is:

A cover for a tape reel having a hub and a pair of spaced, substantially circular flanges extending outwardly from said hub, said cover comprising a solid wrap-around portion enclosing the space formed between the outer peripheries of said flanges, spaced grooves formed on the inner surface of said wrap-around portion snugly receiving the outer peripheries of said flanges, a lateral edge on each of said grooves and said cover being characterized by a plurality of spaced projections integral with said wrap-around portion formed exteriorly of said grooves and projecting inwardly from the lateral edge of one of said grooves and in substantial alignment therewith, said projections being inclined downwardly and inwardly from said lateral edge to guide the flanges of said reel into said grooves when one of the flanges rides on one of said projections as the cover is closed around the reel.

References Cited by the Examiner

UNITED STATES PATENTS

| | | | |
|---|---|---|---|
| 2,330,278 | 9/1943 | Gordon | 206—59 |
| 3,095,969 | 7/1963 | Morrison | 220—97 X |
| 3,124,243 | 3/1964 | Kulka | 206—63 |

THERON E. CONDON, *Primary Examiner.*

LOUIS G. MANCENE, *Examiner.*